April 14, 1964 D. I. CROPP ETAL 3,128,529
MACHINE FOR ASSEMBLING ELECTRICAL COMPONENTS
Filed June 9, 1958 13 Sheets-Sheet 1

FIG. 1

INVENTORS
DAVID I. CROPP
CHALMER C. JORDAN
ROBERT W. LINGO
BY Charles L. Lovenbach
attorney April 14, 1964     D. I. CROPP ET AL     3,128,529
MACHINE FOR ASSEMBLING ELECTRICAL COMPONENTS
Filed June 9, 1958     13 Sheets-Sheet 3

INVENTORS
DAVID I. CROPP
CHALMER C. JORDAN
ROBERT W. LINGO

April 14, 1964    D. I. CROPP ETAL    3,128,529
MACHINE FOR ASSEMBLING ELECTRICAL COMPONENTS
Filed June 9, 1958    13 Sheets-Sheet 6

INVENTORS
DAVID I. CROPP
CHALMER C. JORDAN
ROBERT W. LINGO

BY *Charles L. Lonsheck*
    attorney

April 14, 1964    D. I. CROPP ETAL    3,128,529
MACHINE FOR ASSEMBLING ELECTRICAL COMPONENTS
Filed June 9, 1958    13 Sheets-Sheet 7

INVENTORS
DAVID I. CROPP
CHALMER C. JORDAN
ROBERT W. LINGO

BY *Charles L. Lovenbeck*
attorney

INVENTORS
DAVID I. CROPP
CHALMER C. JORDAN
ROBERT W. LINGO

BY Charles L. Lovercheck
attorney

April 14, 1964    D. I. CROPP ET AL    3,128,529
MACHINE FOR ASSEMBLING ELECTRICAL COMPONENTS
Filed June 9, 1958    13 Sheets-Sheet 13

INVENTORS
DAVID I. CROPP
CHALMER C. JORDAN
ROBERT W. LINGO

United States Patent Office 3,128,529
Patented Apr. 14, 1964

3,128,529
MACHINE FOR ASSEMBLING ELECTRICAL COMPONENTS
David I. Cropp, Warren, Chalmer C. Jordan, Saegertown, and Robert W. Lingo, Meadville, Pa., assignors, by mesne assignments, to Saegertown Glasseals, Inc., Crawford, Pa., a corporation of Delaware
Filed June 9, 1958, Ser. No. 740,966
10 Claims. (Cl. 29—25.2)

This invention relates to assembling machines and, more particularly, to machines for assembling parts including interfitting parts, such as transistors.

One of the elements of a transistor is made up of a wire and bead assembly made up of a small hollow cylindrical glass tube having a wire extending through the opening therethrough with a closure for one end of the tube.

Previous methods and machines for assembling the aforesaid elements of transistors have had various disadvantages. The present machine was conceived for the purpose of overcoming the disadvantages of prior machines. The present machine is made up generally of a first turret and associated mechanism for cutting a wire into equal lengths, straightening it, inserting it into a bead, and hermetically sealing the glass bead to a wire. A second turret assembles the bead and wire into a glass tube. A transfer mechanism transfers the wire and bead to the second turret where the wire and bead are inserted into a glass sleeve and the glass bead is hermetically sealed to the inside of the tube forming a closure for said one end.

In the preferred embodiment of the invention shown herein, the bead and wire assembly turret is made up of a flat plate like table having a top surface disposed in a horizontal plane and rotatable about a centrally disposed axis. An indexing device moves the table intermittently to bring each of sixteen turret heads located on the top surface adjacent the outer periphery thereof on the table successively into position under a wire measuring, cutting and loading station, a feed station at which glass beads are fed down onto the wire, and a plurality of tacking and heating stations where the bead is fused to the wire.

The wire is drawn from a spool of dumit wire of the type commonly used for transistors which is supported on the machine and carried down through a rotary wire straightened. Lengths of predetermined size are cut off of the wire and inserted into driven wire rotating assemblies in the spaced positions in the head and pushed down so the upper end of the wire is located at a given level. The beads are oriented by means of a bowl type vibratory parts feeder and fed down a chute where they are threaded over the wire. The wire and bead then are heated and tacked to the wire. The wire is then lifted to a predetermined position and then cured by passing by a plurality of other stations.

As soon as a given wire and bead assembly has been properly cured by passing selectively through gas flames at the various indexed positions on the bead and wire assembly table, the assembly is then grasped by a transfer device and transferred to the glass tube assembly turret which is also a flat disk like table having approximately twenty driven wire rotating assemblies disposed around the outer peripheral top surface thereof. Heat for fusing the glass bead to the dumit wire and heat for fusing the bead to the inside surface of the glass tube are provided by gas burners which are supported at spaced positions around the turrets. The burners are located around the turret in position to direct a flame onto the article at each station. The turret stops at each station for fusing the glass together and for curing the glass.

More specifically, it is an object of this invention to overcome the disadvantages of prior assembly machines and to provide an improved assembly machine which is simple in construction, economical to manufacture, and simple and efficient in operation.

Another object of this invention is to provide an improved method and apparatus for feeding heads in an assembling machine.

Yet another object of the invention is to provide an improved wire straightening and cutting device for cutting wire into predetermined lengths in combination with a transistor assembling machine.

Still another object of this invention is to provide an improved machine for cutting wire into predetermined lengths and assembling it on beads and sealing and curing the wire thereon.

It is another object of the invention is to provide an improved machine for cutting wire into predetermined lengths, assembling the wire in beads, and hermetically sealing the beads to the wire.

A further object of the invention is to provide an improved machine made up of two horizontally disposed rotatable turrets with a beaded wire assembly device at one turret, a transfer device for transferring the bead and wire assembly from the one turret to the other, and a device for assembling a tube on the bead and wire at the second turret.

Yet a further object of the invention is to provide an improved machine for assembling beads on predetermined lengths of wire, transferring the beads to a second turret, and assembling another component on the beaded wire on the second turret.

A still further object of this invention is to provide an improved support head for supporting the distal end of a wire while the wire is being rotated and heated during rotation.

Still yet a further object of this invention is to provide a machine having a table movable intermittently, spaced article supports on the table, and a support device at each article support, each article support having a permanent magnet fixed to the machine frame for holding the article temporarily at one end and a notch to receive a first end of the article with a lever to swing over the article to hold it loosely as the article is moved in the support while the article is rotated by a force applied to the opposite end thereof.

It is a further object of this invention to provide a support for supporting one end of a wire while it is being heated which firmly holds one end of the wire and rotates it while the other end is supported in a notch, and means to close the open edge of the notch to allow the wire to rotate freely therein.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

*General Description of Machine*

The machine is made up generally of a frame 10 supporting a wire and bead assembly turret 11 and a glass tube and bead assembly turret 12. The turrets 11 and 12 are fixed to axles 13 and 14, respectively, and connecting means is provided to selectively and intermittently rotate the turrets 11 and 12 about their respective axes and stop them at the respective loading, fusing, and sealing stations at predetermined intervals.

Two spaced, parallel, vertically extending columns 15 and 16 support a wire straightening mechanism 17, a wire measuring device 18, a clamp and cut-off 19, and a wire loader 20. The columns 15 and 16 are in turn themselves fixed to the frame 10 at their lower ends and support at their upper ends a guide sheave 21 which guides dumit wire from a spool 22. The wire straightener 17 is rotated at a constant rate of speed by an electric motor 23.

Feeders 24 and 25 may be of the type shown in Patent No. 2,609,914. The beads are fed to the assembling position on the turret 11 by means of the vibratory type bowl feeder 24 of a well known design which feeds the beads in oriented position down a chute to their assembled position on the wire. Wire rotating assemblies 26 are supported at spaced positions adjacent the outer periphery of the bead loading turret 11.

The glass tube assembly turret 12 is similar in many respects to the bead assembly turret 11; however, the glass tube assembly turret 12 in the embodiment shown has a larger number of loading stations than the bead loading assembly turret 11 in order that each loading station will remain in the heat a longer period of time to properly cure the assemblies which are of greater size and volume than the assembly made up of all the components after the tube is assembled.

The wire rotating asesmblies 26 are spaced around the upper outer periphery of the glass tube assembly turret 12 on the upper surface and the axle 14 is rotatably supported on a bearing under the table supported on the fixed frame 10. A stationary cam 625 which engages and partly opens the upper wire holder as the wires are transferred is supported on an arm 27 which is supported on the machine frame 10 by means of a vertically extending column 28. One of the wire holders 600 is supported on the turret 12 adjacent each wire rotating assembly 26.

Spaced gas burner jets 29 are attached to the frame 10 and disposed around the periphery of both the bead loading turret 11 and the tube loading turret 12. The gas jets 29 heat the glass and seal the beads to the wire and, subsequently, the gas jets 29 disposed around the turret 12 seal the beads to the inside of the glass tubes.

The machine takes wire from the spool 22, the mechanism 17 straightens the wire, the wire is measured, cut, and loaded into the wire rotating assemblies 26, a bead is fed down over the wire by the feeder 24, the wire is pushed down by the wire push down member B and is heated to tack the bead in place by the first burner and then pushed up by a member A to prevent heat damage to the bearings of the rotating assembly, and the wire is then indexed to each of the positions of the wire bead assembly turret 11, being heated to anneal it at each of the positions until it reaches the position under an arm 35 where it is lifted and transferred by the arm 35 into one of the rotating members in the glass tube and bead assembly turret where a glass tube has already been fed by a feeder 30. The wire is held in place temporarily by a magnet while the turret indexes one position during which time an arm closes to hold the wire in position. The wire is then pushed down. Then the turret continues to index, sealing and annealing the tube and bead until the turret reaches the position at the unloading station where the assembly is lifted, swung from over the turret, and dropped by jaws 511.

*Transfer Mechanism*

The transfer mechanism lifts the wires with glass beads cured thereon from the respective wire rotating mechanisms on the turret 11 as they approach the arm 35. The transfer mechanism has a driving shaft 34 with suitable flexible or universal joints 34a and 34b which connect to the operating arm 35. The arm 35 is swingable in a vertical plane from the position shown through an arc of one hundred eighty degrees to the dotted line position. The shaft 34 is operatively attached to the arm 35 and has a spur gear 34c fixed on the end thereof. The shaft 34 is journalled at the outer end in a bearing 34d to the frame 10. A gear segment 34e is journalled on the frame 10 at 34f and has a link 34g pivoted thereto at 34h. The shaft 34 is also journalled at 34j and fixed to the arm 35 at 36. A cam 408a is driven in timed relation with the indexing mechanism and engages the lower end of the link 34g whereby the link 34g is driven up and down at predetermined intervals, rotating the spur gear 34c and swinging the arm 35 from the full line position shown over the turret 11 to the dotted line position over the turret 12.

A cam 404 engages a rod 404a attached to ways 36a to lift the arm 35 vertically just before it is swung by the gear segment 34c. Thus, when a wire on the turret 11 is first gripped by the arm 35 in a manner hereinafter described, the wire with the bead thereon will be lifted by the arm 35 through the way 36a out of the wire rotating mechanism. Then the arm 35 will swing one hundred eighty degrees to bring the wire with the bead thereon to a position over a wire rotating mechanism in the turret 12. When the arm 35 has swung to this position, the wire will be lowered into the said wire rotating mechanism in the turret 12. The arm 35 will then release the wire as explained hereinafter and the arm 35 will then be ready to swing to a position over the turret 11 for another wire and bead.

A fixed jaw 35a is attached to the arm 35 and extends perpendicular thereto. A movable jaw 35b is slidably disposed on the arm 35 and urged toward the fixed jaw 35a by a tension spring 35c. An arm 35f is attached to the upper end of a lever 35m which extends up through the frame 10 and swings in a horizontal plane therewith. An end 35g of the arm 35f engages a plunger 35h to push it into engagement with one arm of the plunger 35h swingably mounted to a bell crank 35j. The lower end of the lever 35m is actuated by a cam 409. A leg 35k of the bell crank 35j swingably mounted on the table engages the end of a slide 35n attached to the movable jaw 35b. The spring 35c urges the jaw 35b to closed position. Therefore, when the cam 408a swings the arm 35, the movable jaw 35b will be moved by the spring 35c and grip a wire between it and the fixed jaw 35a. When the cam 408a allows the arm 35 to swing to its rest position, the movable jaw 35b will be forced to release the wire by the cam 409.

Bead Loader Assembly

The bead loader assembly is shown in FIGS. 18, 19, 20, 30, 31, and 32 and is made up of a plate 48 supported on the fixed machine frame 10 and having a bore 49 extending therethrough with an anti-friction bearing 50 for slidingly receiving lifting links 61. A bore 52 in the plate 48 has an anti-friction bushing 53 therein for rotatably receiving a jaw opening cam lever 47.

The plate 48 has a vertical leg 55 welded thereto at 56 and an intermediate arm 57 welded thereto at 58. The intermediate arm 57 has two laterally spaced bores 59 which receive bushings 60 which slidably receive the upper ends of the lifting links 61. The lifting links 61 have helical compression springs 63 telescopically received thereon and a collar 64 concentrically disposed thereon and fixed thereto. Therefore, the helical springs 63 engage the collars 64 at one end and engage the intermediate arm 57 at the other end and urge the lifting links 61 downwardly. Bead loader jaws 66 are fixed to the upper ends of the lifting links 61 and locked thereto by means of a screw 67.

The upper end of the vertical leg 55 has an upper arm 68 fixed thereto at 69 and it extends forwardly therefrom. The upper arm 68 has a horizontal bore 50A therein which receives a pin 46 which is slidable in a bushing 69a and which operates to discharge a bead into a counterbore 86 in the jaws 66 when the jaws 66 are in their closed position. The beads are fed downwardly from the feeder 24 through a tube 24a.

The upper end of the cam lever 47 has a camming surface 72 which slidably engages the pin 46 and forces it forward when a lower end 54 of the lever 47 is rotated by a cam 403 through a plunger and a crank 421, a slidable shaft 423, and an arm 420. The shaft 423 slides in bearings 424 in synchronism with the other elements of the machine. This allows beads to intermittently fall into a counterbore 86 from the tube 24a.

Figures 19, 20, 31, 32:
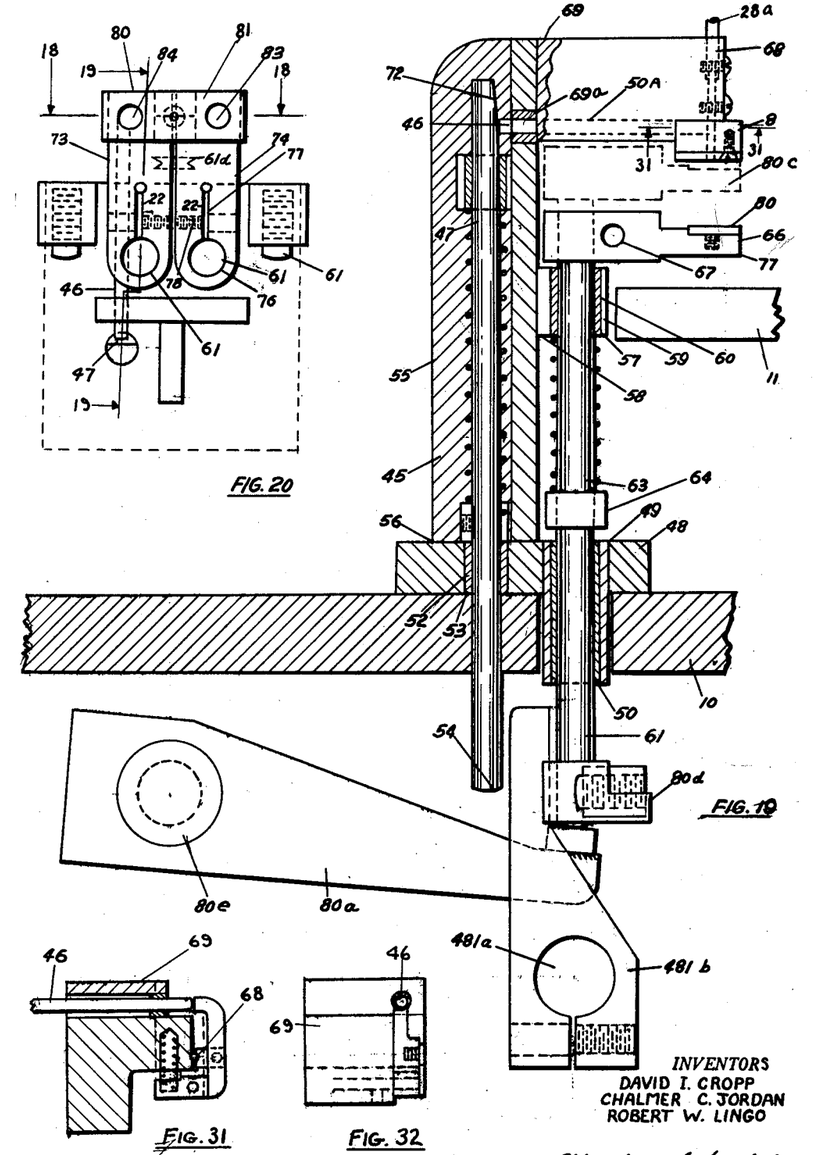
FIG. 19 is a view taken on line 19—19 of FIG. 20.
FIG. 20 is an enlarged view of the bead loader.
FIG. 31 is a cross sectional view taken on line 31—31 of FIG. 19.
FIG. 32 is a front view of a part of the device shown in FIG. 19.
Figure 21:
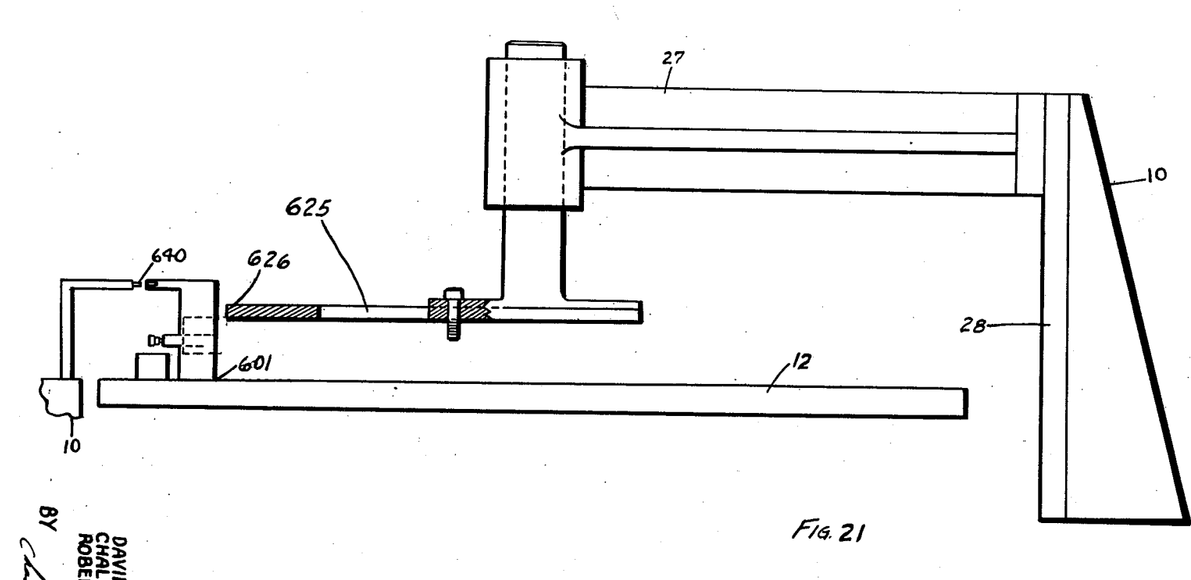
FIG. 21 is a partial side view partly in cross section of the support for the cam over the glass case assembly turret taken on line 21—21 of FIG. 4.
Figure 22:
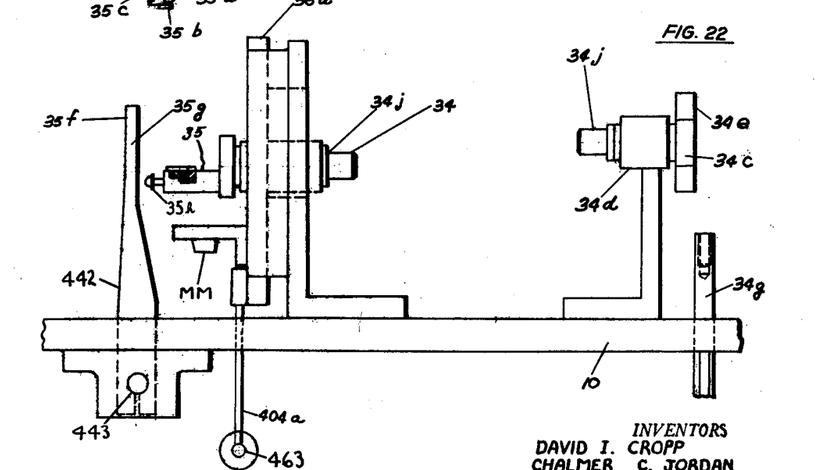
FIG. 22 is a cross sectional view taken on line 22—22 of FIG. 4 and line 22—22 of FIG. 23.
Figure 23:
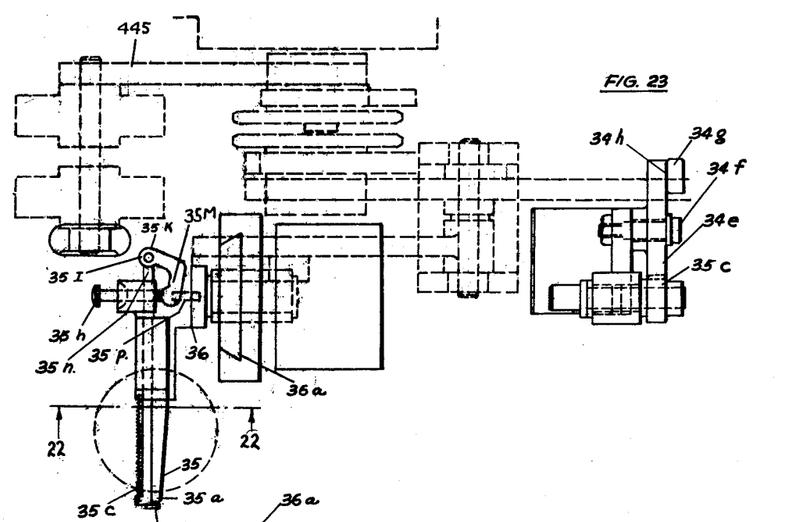
FIG. 23 is an enlarged top view of the transfer mechanism and some associated parts of the machine shown in phantom.
Figure 24:
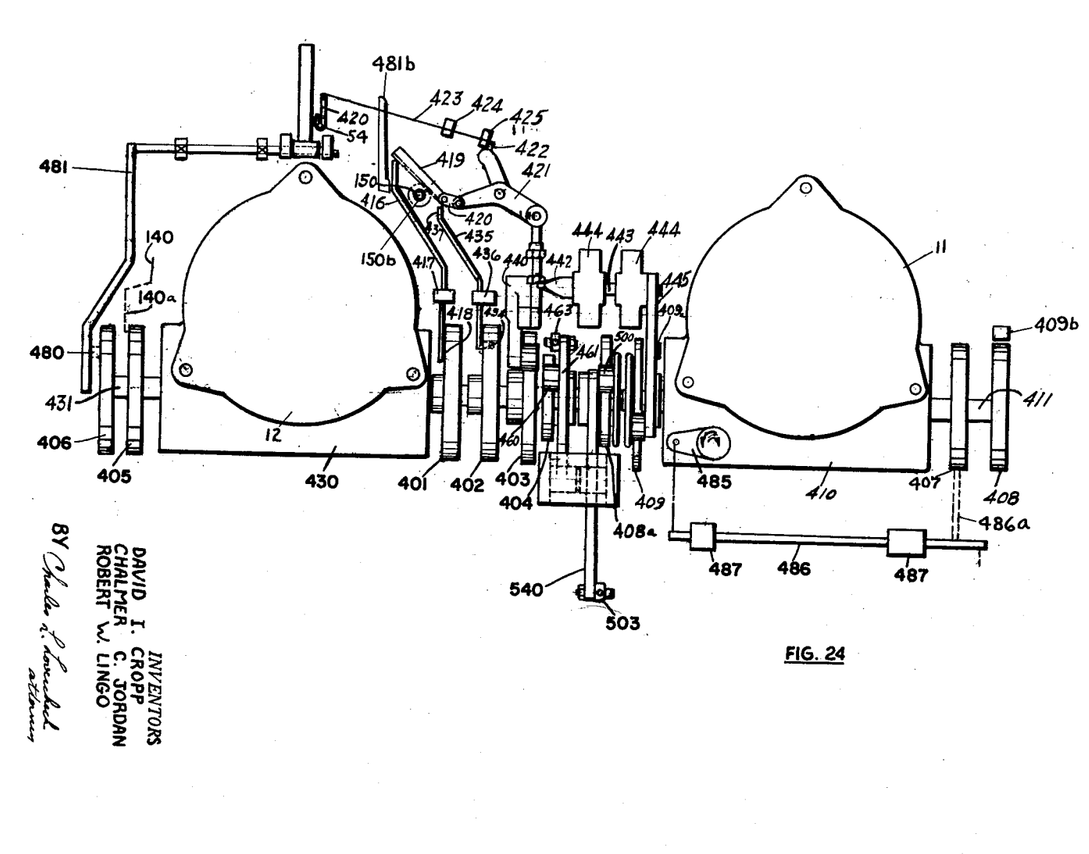
FIG. 24 is a top view partly shown schematically of the machine with the turrets and certain other mechanism removed.
Figure 25:
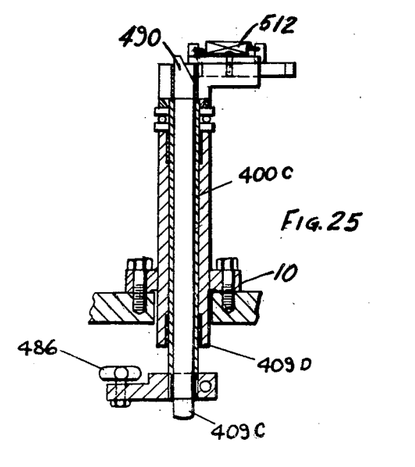
FIG. 25 is a cross sectional view of the assembly unloader.
Figures 26, 27, 28, 29:
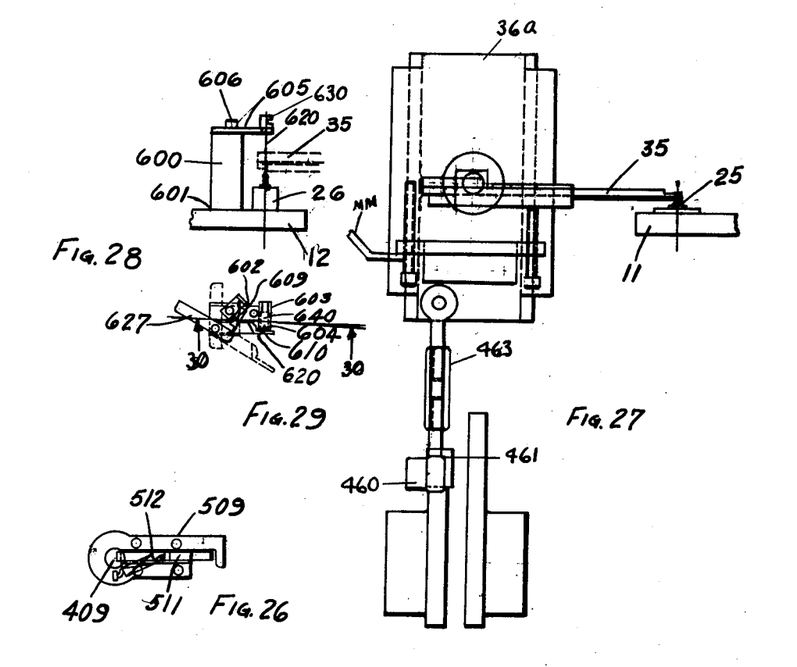
FIG. 26 is a top view of the device shown in FIG. 25.
FIG. 27 is a top view of the transfer mechanism.
FIG. 28 is a side view of the stem support for the second turret.
FIG. 29 is a top view of the mechanism shown in FIG. 28.
Figure 30:
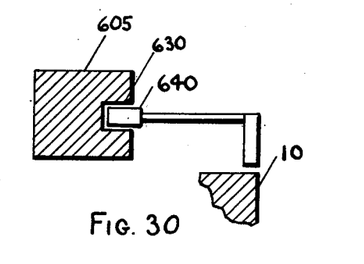
FIG. 30 is a view of the magnet support taken on line 30—30 of FIG. 29.

The jaws 66 are indicated as 80 and 81 shown in enlarged detail in FIG. 20. They are each fixed to one of the arms 73 and 74. The arms 73 and 74 are attached to the lifting links 61 by means of screws 67 and 78. The jaws 80 and 81 are shown in detail in FIG. 20. When the jaws 80 and 81 are moved together, a bore 85 is formed half in each jaw. A countersink 84 is in the form of a countersink of the bore 85 which extends through the jaw and receives the end of the cut wire and guides it up into the bead held in the counterbore 86 between the jaws 80 and 81. The jaws 80 and 81 are moved up by a lever 80a to receive the bead.

In assembly, the bead is received in the enlarged counterbore 86 when the jaws 80 and 81 open partly by an arm 481b actuated by a cam 406. As the cam 406 continues to rotate, it allows the jaws 80 and 81 to partly close and the bead is held in the counterbore 86 by spring tension of a spring 61d. The lifting links 61 have a set screw which holds the spring 61d. After the bead is firmly grasped by the jaws 80 and 81 urged by the spring 61d, the jaws 80 and 81 are lowered by the lever 80a actuated by a cam 401. The jaws 66 are lowered to bring the bead over the wire held in a rotating member 19a so that the wire enters the countersink 84 and is guided by the bore 85 to enter the bead nested in the jaws 80 and 81. Then the arms 481b engage crank members 80d to swing the jaws 66 away from each other. The arm 481b will then swing again to open the jaws 80 and 81 and release the bead on the wire. The table will then index to bring the wire with the bead thereon to the next position into the flame at the first heating station.

Wire Sraightener

The wire straightener 17 is made up of a rotatable body member 18c. The rotatable body 18C is made of a piece of metal rectangular in cross section having an elongated groove 117A formed therein. The body 18C is rotatable about a longitudinal axis through a journal 171. The journal 171 is integrally attached to the upper end of the member 18C and rotatably supported in an anti-friction bearing 172 which is supported in a top plate 173 in turn rigidly attached to the columns 15 and 16. The top plate 173 has bores 175 therein which are slotted to the outside and provided with a clamping bolt 176 at each side thereof. The clamping bolts 176 clamp the top plate 173 to the columns 15 and 16. In like manner, a lower transverse plate 177 has bores 178 therein and a laterally extending slot communicating from the bores 178 to the outside of the plate 177. The edges of the slot are pressed together by bolts 179 to clamp the lower transverse plate 177 rigidly to the columns 15 and 16 in fixed spaced relation to the top plate 173.

A lower shaft 180 extends through an anti-friction bearing 181 which is supported in the lower transverse plate 177. A pulley 184 is fixed to the lower end of the shaft 180 and the pulley 184 is driven through a belt 185 by the motor 23 continuously.

The spool of wire 22 is supported on an axial shaft 220 which has a laterally extending central shaft which is received in a slot 221 in a bracket 222. The wire extends around a sheave 223 which is in turn rotatably supported on a shaft 224 which is in turn supported on the bracket 222. The wire then extends over the sheave 21 and down through an axial bore 225 between tips 186 of fingers 187. The fingers 187 are supported in bores 188 in the member 18C and are held in place by set screws 189 which engage threaded bores 190 in the member 18C. It will be noted that the fingers 187 are staggered relative to each other and that the finger tips on the one side overlap the fingers on the other so that the wire passes from the bore 225 to a bore 226 in a serpentine path. Thus, a stress is introduced into the wire as the rotatable body member 18C rotates and any curvature in the wire is removed and the wire emerges from the bore 226 to the subsequent operative mechanism in a straight form.

Cam Mechanism

Below the turrets 11 and 12 supported on the machine frame 10 is the cam mechanism which actuates various operative parts of the machine. The cam mechanism is made up principally of a motor which drives a shaft through suitable gear reducers 410 and 430.

The gear reducer mechanism 410 is supported on the machine frame 10 and has a shaft 411 driven thereby at a constant speed through the motor. The shaft 411 has spaced cams 401, 404, 407, 408, 408a, and 409. These cams have a suitable cam surface on the periphery thereof or, according to good cam design practice, the camming surface could be cut as a laterally disposed groove inside of the cam to receive suitable follower members.

A shaft 431 is driven by the gear reducer 430 at a constant speed and has the cams 403, 402, 405, and 406 fixed thereto and rotatable therewith. Each of these cams operates one of the operative elements on top of the machine through a suitable linkage. The cam 401 actuates a lever 416 through a follower 418 which is pivoted through a suitable bearing 417 to the frame which is attached to a rod 18P in turn slidable vertically and mounted on the frame 10 by means of the bearings 424 and 425 and attached to a crank mechanism 426 to move a wire loader 20 up and down in synchronism with the other operative elements of the machine.

The cam 402 has a follower member 434 on a lever 435 and the lever 435 is swingably mounted at 436 on the machine frame 10. A distal end 437 of the lever 435 engages the lower end of a rod 18a and the rod 18a, being attached to the wire measuring device 18, moves the wire measuring device 18 up and down a distance determined by the throw of the cam surface on the cam 402 and in synchronism with the other operative elements of the machine. The rod 18a extends through a bore 18b of the clamp and cut-off 19 (FIGS. 9, 10 and 11) and freely slides therethrough.

The cam 403 operates the jaw of the wire loader 20 through a follower 440 and thence engages the crank 421 which is connected to a rack 419 which in turn delivers motion to a square shaft 150 through a pinion 150b. The cam 403 also acts through the follower 440 to the crank 421 and a lug 422 to actuate the shaft 423 through the arm 420 to rotate the lower end 54 attached to the bead escapement.

The cam 404 acts through a follower 460 attached to a lever 461 to control a rod 463. The lever 461 is attached to the lower end of ways 36a of the transfer mechanism to raise and lower the ways 36a with the transfer arm 35 attached thereto.

The cam 405 has a follower thereon which operates a push up rod 140a attached to a lower end 140 of a support column 139.

The cam 406 has a follower 480 which, through a rod 481, rotates the arm 481b attached to a shaft 481a to open and close the bead loader jaws 66. The shaft 481a is attached to the arm 481b and in turn engages the crank members 80d to swing the lifting links 61 with the bead loader jaws 66 on top thereof to open position.

The cam 407 rotates through a shaft 486 a crank arm 485 intermittently which, in turn, is rotated by the shaft 486 which is rotatably supported in a bearing box 487 fixed to the machine frame 10. The shaft 486 has a shaft 488 attached to the distal end thereof which in turn engages a rod 490 on the wire unloading pick off through the shaft 488 to lift the completed transistor assemblies from the wire rotating mechanism wherein they are supported.

The cam 408 first slides on a cam surface 409b and deflects a spring 512 to clamp the wire. As the cam 408 continues to rotate, it lifts a link 409C and the rod 490 of the link 409C slides a movable jaw 511 to close it on the wire. The cam 408 also lifts a sleeve 400C. Then when the lower end of the sleeve 400C hits an assembly 409D, the entire assembly 409D is lifted, lifting the wire out of the rotating assembly.

The cam 408a operates through a follower 500 which in turn controls a lever 540 to move a link 503 which in turn actuates a rack on the bottom of the link 34g to rotate it and swing the arm 35 around after the completed bead and wire assembly is clamped between the fixed jaw 35a and the movable jaw 53b urged together by the spring 35c.

The cam 409 actuates a follower 445 and, through a shaft 443 in bearing blocks 444 to an arm 442, engages the plunger 35h through a bell crank 35M to a leg 35k attached to the movable jaw 35b to open the jaws of the transfer arm against the force of the spring 35c.

*Wire Measure and Feed Assembly*

The wire measure and feed assembly is shown in FIGS. 1, 2, 3, 7, and 8. It is made up of a body portion 160 which may be in the form of a casting, forging, or block machined to proper dimensions, or the like. The portion 160 has spaced bosses 161 and 162 thereon which have bores 163 and 164, respectively, therethrough which slidingly receive the columns 15 and 16, respectively. The wire measure slides up and down on the columns 15 and 16 and suitably receives the square shaft 150 which slides in an opening in the body 160 and freely rotates therein and slides in a square hole in a cam 168. Since the shaft 150 and the hole receiving it in the cam 168 are of the same shape, the cam 168 is restrained to rotate with the shaft 150.

A clamping arm 165 for clamping the wire intermittently is swingably supported on the bottom of the body 160 at a fixed pivot 166 and a lever arm 167 is integrally attached to the arm 165 which acts as a follower for the cam 168. The cam 168 slidably receives the square rotating shaft 150 which is freely rotatable in a hole through the body 160. The shaft 150 extends downwardly from the wire measure through the table through the wire clamp and cut-off and through the wire loader 20 and is driven by the cam 403 in a manner to be later described.

A spring 152 is disposed in a bored stop 152a which urges the arm 165 to swing about its fixed pivot 166 to bring a jaw 153 into engagement with a fixed jaw 154. The fixed jaw 154 is attached to a stop member 155 which is in turn locked in fixed relation to the body 160 of the wire measure device by means of a screw 157. A rod 18a extends through bores 18b in the wire clamp and cut-off member 19 and extends along behind the wire loader 20 and thence down under the table. This up and down motion of the rod 18a is caused by the cam 402 under the turret 11 operated in synchronism with the other cams under the turret 11.

*Wire Clamp and Cut-Off*

Figure 9:
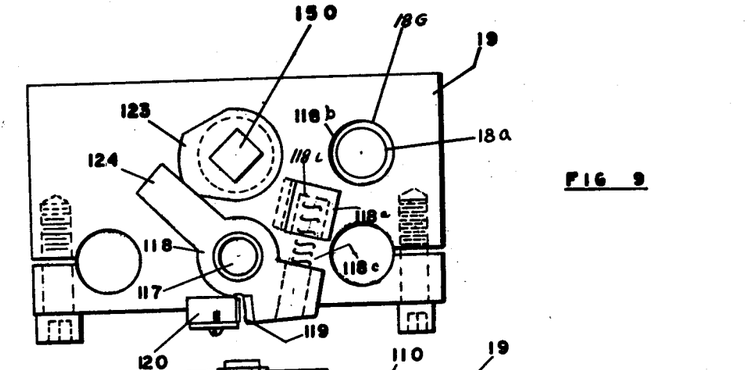
FIGS. 9, 10, and 11 are enlarged views of the clamp and cut-off mechanism.
Figure 10:
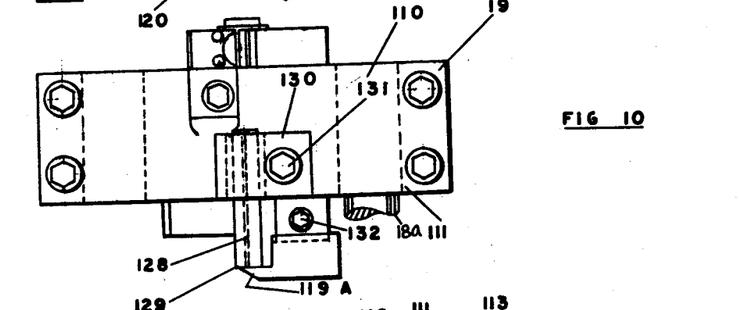
Figure 11:
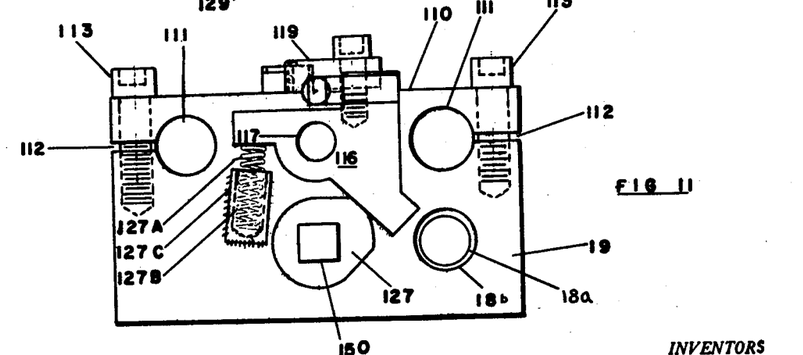

The wire clamp and cut-off 19 is shown in FIGS. 9, 10, and 11 in detail and is shown in a top view in FIG. 9, a front view in FIG. 10, and a bottom view in FIG 11. A body 110 is generally rectangular in plan view and has bores 111 which receive the columns 15 and 16. The bores 111 have a slot 112 running from the bores 111 to the outside edge of the body 110 and screws 113 clamp the body 110 rigidly to the columns 15 and 16 against vertical movement thereon.

A clamping arm 118 is swingably attached to the body 110 by means of a shaft 117 which extends into a bore in the body 110. An arm 124 is attached to the clamping arm 118. The arm 118 has a clamping edge 119 thereon which terminates in a wedge shaped wire engaging edge and is adapted to engage the wire and clamp it between a stop 120 and the clamping edge 119. A stop 118a has a bore 118b supporting a spring 118c. A cam 123 slidably receives the square shaft 150 and rotates therewith. The cam surface on the cam 123 engages the lever arm 124 on the clamping arm 118 to swing it on its shaft 117.

A lever 116 is swingable on the body 110 on its shaft 117 and driven by a cam 127. The cam 127, in turn, slidably receives the square shaft 150 in a complementary shaped hole therein and rotates therewith. The lever 116 is swingably supported on the body 110 and has an end engaged by the cam 127. The lever 116 is urged into engagement with the cam 127 by a spring 127A which engages the lever 116 at one end thereof. The spring 127A is disposed in a bore 127B in a stop 127C. The stop 127C is in turn fixed to the body 110. The wire from the spool 22 extends through a bore 128 in a wire guide 129 and a cutting edge 119A shears off the wire flush with the lower side of the wire guide 129. The wire guide 129 is attached by means of a bracket 130 to the body 110. The bracket 130 overlies the wire guide 129 an dis fixed to the body 110 by means of a stud 131. The cutting edge 119A is attached to the lever 116 by means of a screw 132.

In the action of the clamp and cut-off 19, as the square shaft 150 rotates, the clamping arm 118 is forced by the spring 118c to swing into engagement with the stop 120 as the cam 123 moves away from the lever arm 124, clamping the wire between the stop 120 and the clamping edge 119. As the square shaft 150 continues to rotate, the cam 127 will positively swing the lever 116 against the force of the spring 127A to bring the cutting edge 119A into engagement with the wire and to cut off a length thereof. The wire has, at the same time, been clamped and is held in place by the wire loader 20 which is slidably mounted on the columns 15 and 16. After the wire is cut, the cam 401 under the table will move the wire loader 20 down, bringing the piece of wire into the rotating mechanism where a detent ball 203 will engage the wire to hold it for rotation with a a sleeve 32.

Wire Push Up

Figure 1:
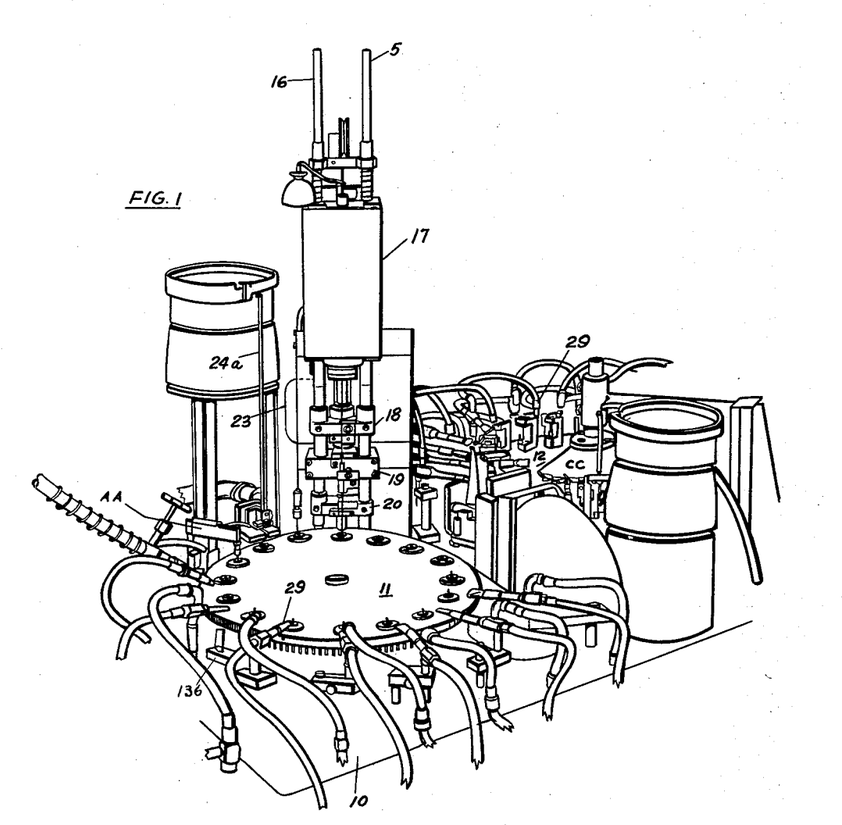
FIG. 1 is an isometric view of a machine according to the invention.
Figure 2:
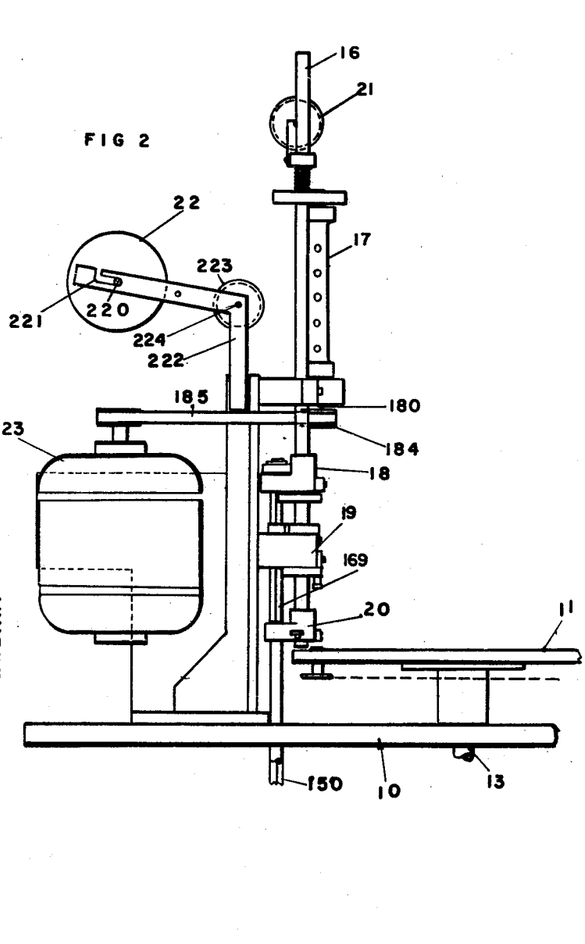
FIG. 2 is a partial front view of the machine.
Figure 3:
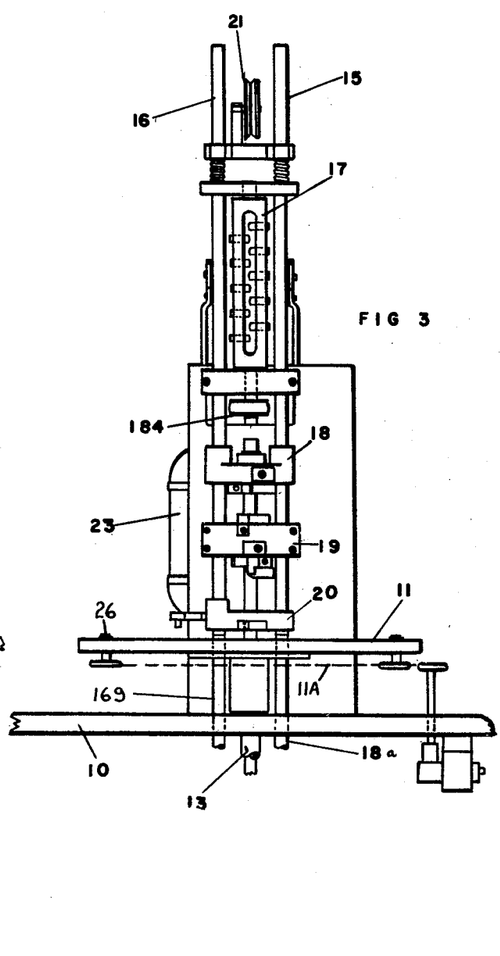
FIG. 3 is a partial side view of the machine.
Figure 4:
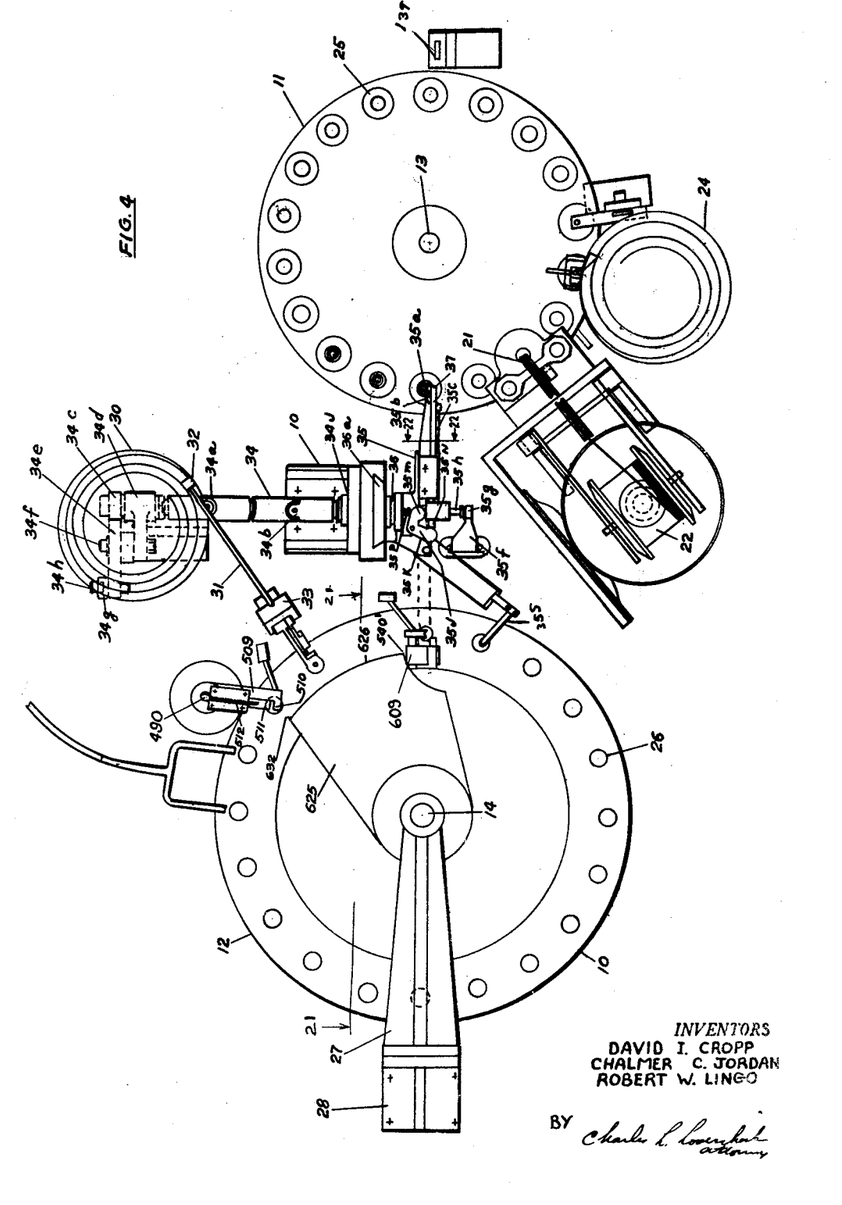
FIG. 4 is a top view of the machine.
Figure 5:
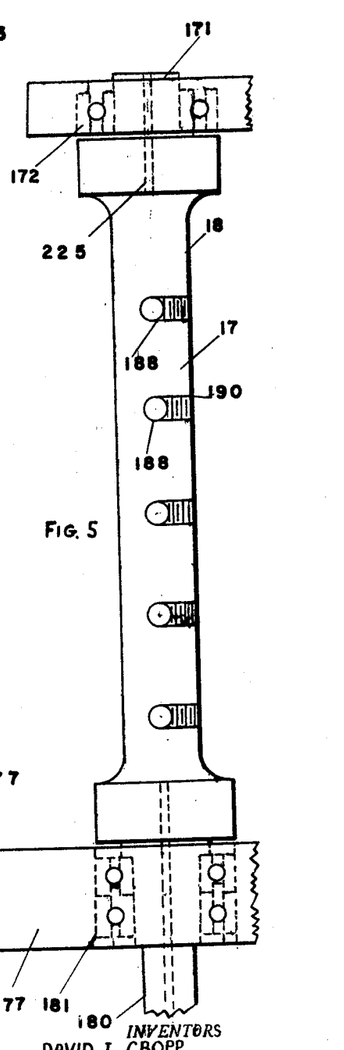
FIGS. 5 and 6 are detailed views of the wire straightener.
Figure 6:
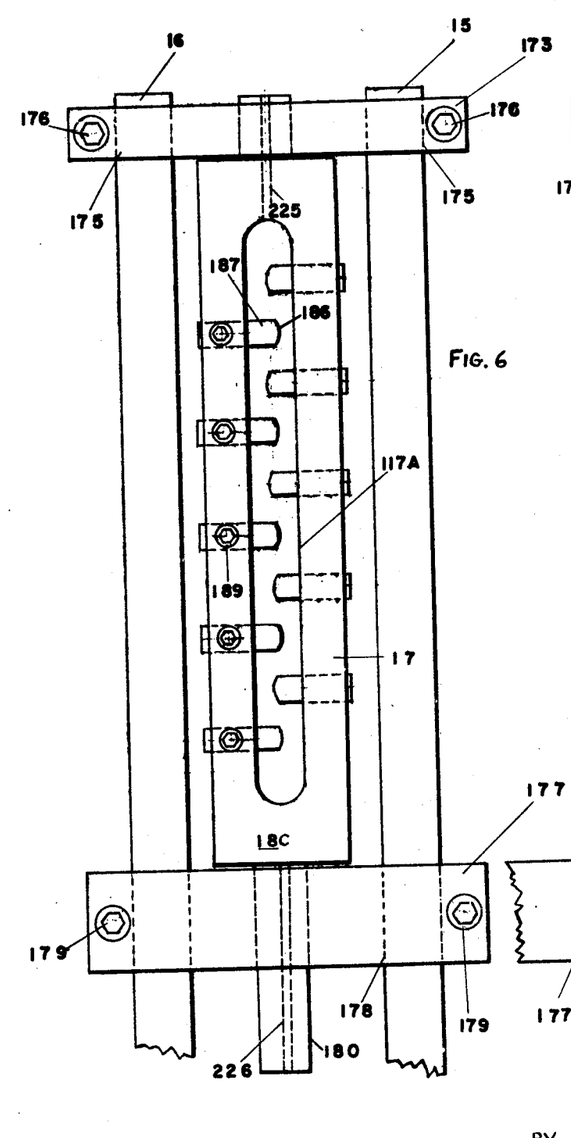
Figures 7, 8, 12, 13, 18:
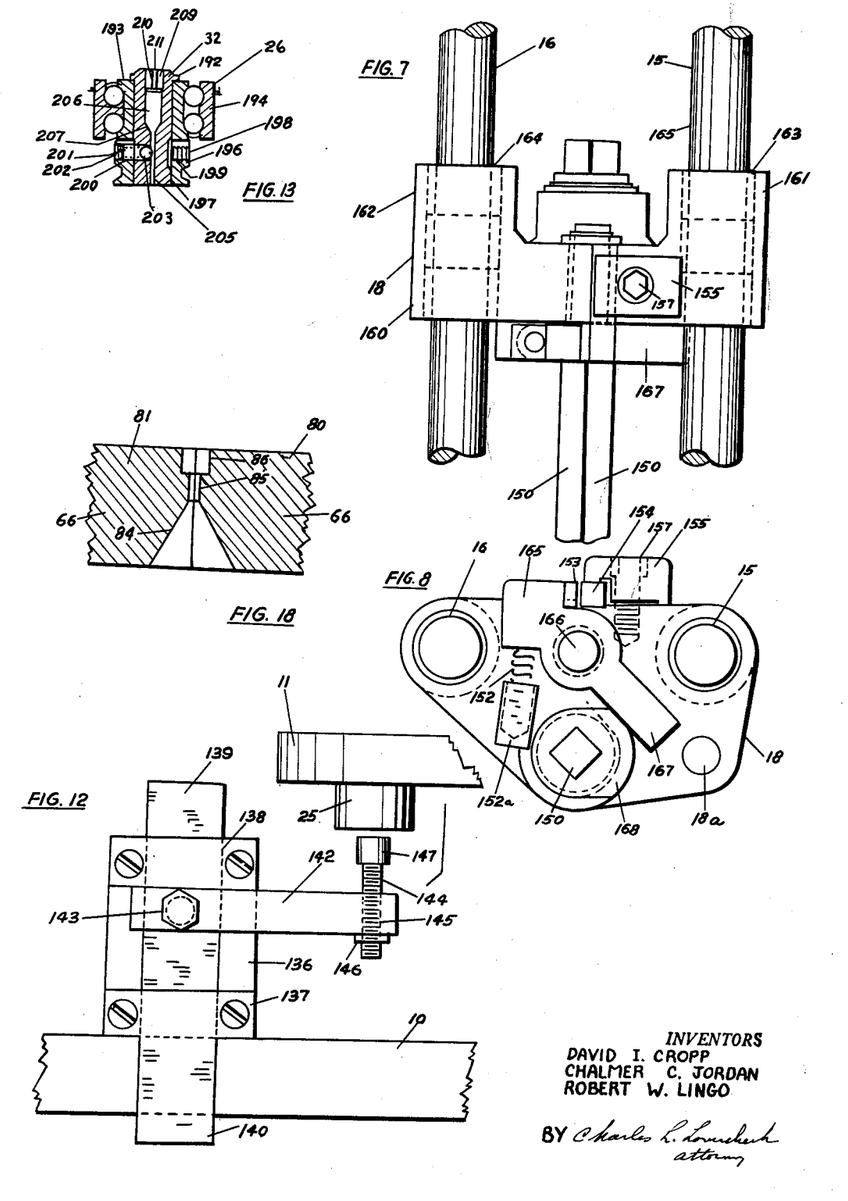
FIGS. 7 and 8 are enlarged views of the wire measure.
FIG. 12 is an enlarged view of the wire push up.
FIG. 13 is an enlarged view of the wire rotating assembly.
FIG. 18 is a view taken on line 18—18 of FIG. 20.

The wire push up is shown in FIG. 12 and is for the purpose of pushing the wire and bead tacked thereto at the first station upward slightly so that the flames playing on the wire and beads at subsequent stations will not impinge on the bearings of the wire rotating mechanisms which might damage the bearings.

The wire push up mechanism is made up of a fixed frame portion 136 attached to the frame 10 having guides 137 supported thereon. The guides 137 have a bore 138 therein which guides the support column 139 in its upward and downward travel. The lower end 140 of the support column 139 is connected to the cam 405 by means of the push up rod 140a. The support column 139 is moved up and down at appropriate times by means of the cam 405 driven at a constant rate and synchronized with the other cams which engage the lower end of the push rod 140a in a manner which will be later described.

A bracket 142 is fixedly attached to the support column 139 by means of a bolt 143 and moves up and down therewith. An adjustable stud 144 threadably engages a threaded bore 145 in the bracket 142 and is held in a predetermined position by means of a lock nut 146. Therefore, a head 147 of the stud 144 can be adjusted up and down to the desired position. The cut pieces of wire are held in the wire rotating mechanism 26 and the head 147 will engage the lower end of the cut wire extending below the rotating member 26 and will push the wire up to a predetermined position when the cam 405 moves the support column 139 upwardly. The position to which the wire can be pushed can be adjusted by adusting the stud head 147.

Glass Case Assembly Mechanism

The glass case assembly is made up generally of a vibratory parts feeder 30, an escapement mechanism 90, and the turret 12.

After each bead is assembled on the cut piece of wire by the first turret and has been hermeticaly sealed thereto by the heat from the gas flames at successive stations, each wire with a bead thereon is transferred from the turret 11 to the turret 12 into one of the wire rotating assembly members 26 thereon. There, glass cases 88 which have been contained in the bowl of the vibratory feeder and loader 30 are fed down a feed tube 31. The feed tube 31 has several glass cases 88 therein at all times which are continuously fed to it by the feeder 30; that is, the tubular glass cases 88 are disposed in a continuous line inside of the feed tube 31. The feed tube 31 is attached to the escapement mechanism 90 which releases one tube 88 each time the turret 12 advances or indexes one position.

A bracket 92 is attached to the frame 10 at 93 and fixed in position thereon. A lever 94 is swingably attached to the bracket 92 at 95 and has connecting links 96 pivoted thereto at 97 which are, in turn, pivoted at 98 to a rocker arm 99 attached to a pivot axle 100. A link 101 is swingably attached to the lever 94 at 94a. The lower end of the link 101 is actuated by the cam 409 which hooks to a cam 409a to be described later. The cam 409a is driven by a common shaft and synchronized with the other cams which operate the other elements of the machine. Therefore, a glass tube 88 will be discharged from a nozzle 91 each time the turret 12 advances another rotating assembly 26 into position.

The arm 99 is attached to the axle 100 which is, in turn, attached to a swinging cam lever 103. The lever 103 is in turn rotatably connected to the escapement mechanism 90 at the axle 100. A detent lever 105 is swingably attached to the escapement mechanism 90 on an axle 104 so that when the cam 103 is rotated by the cam 409 through the members 94, 96, and 101, the surface 103a will engage luges 105a and swing the lever 105 upward and move a detent 105B out from an opening in the tube 31 from in front of a first glass case 88 in the tube 31 and allow the first glass case 88 to feed through the nozzle 91 into the position shown while the next glass case 88 will be impeded by a detent 105c attached to the lever 105 and extending through an opening in the tube 31. As the detent 105B moves downwardly through an opening in the top wall of the tube 31, the detent 105c moves upwardly through another opening through the wall of the tube 31 to intercept the second glass case in the aforementioned manner.

Wire Rotating Assembly

The wire rotating assembly provides a means for rotating the cut pieces of wire while the bead and/or glass case is being hermetically sealed thereon so that the entire assembly will be uniformly heated. The wire rotating assemblies are indicated at 26 on the turret 11 and are shown in detail in FIG. 13.

The body of the wire rotating assembly 26 is a generally cylindrical member 19a which has an upper flange 192 which rests on top of an inner race 193 of an antifriction bearing which has an outer race 194 which is pressed or otherwise secured in the bore in the top of one of the turrets 11 or 12. A sleeve 196 has a bore 197 therein which receives the lower end of a cylindrical member 191 and is clamped thereto by means of a set screw 198 so that a cylindrical member 33, along with the race 194, rotates as a unit. The set screw 198 threadably engages a threaded bore 199 in the sleeve 196.

A lateral bore 200 has a spring 201 disposed therein. The helical compression spring 201 is held in position by means of a set screw 202 which is threadably supported in an outer threaded portion in the inner race 193. The detent ball 203 is urged inwardly by the spring 201 so that the ball 203 engages a cut piece of wire which will extend from a bore 210 through a central axial bore 205. The central axial bore 205 is counterbored at 206 with a converging portion 207 between the counterbore 206 and the bore 205. A cylindrical insert 209 is inserted in the counterbore 206 with the bore 210 therein. The bore 210 has an upwardly disposed conical countersink 211 which is adapted to guide a piece of wire into the bore 210. A sheave is attached to the lower end of the bore 197 driven by a chain 11A.

Figures 16, 17:
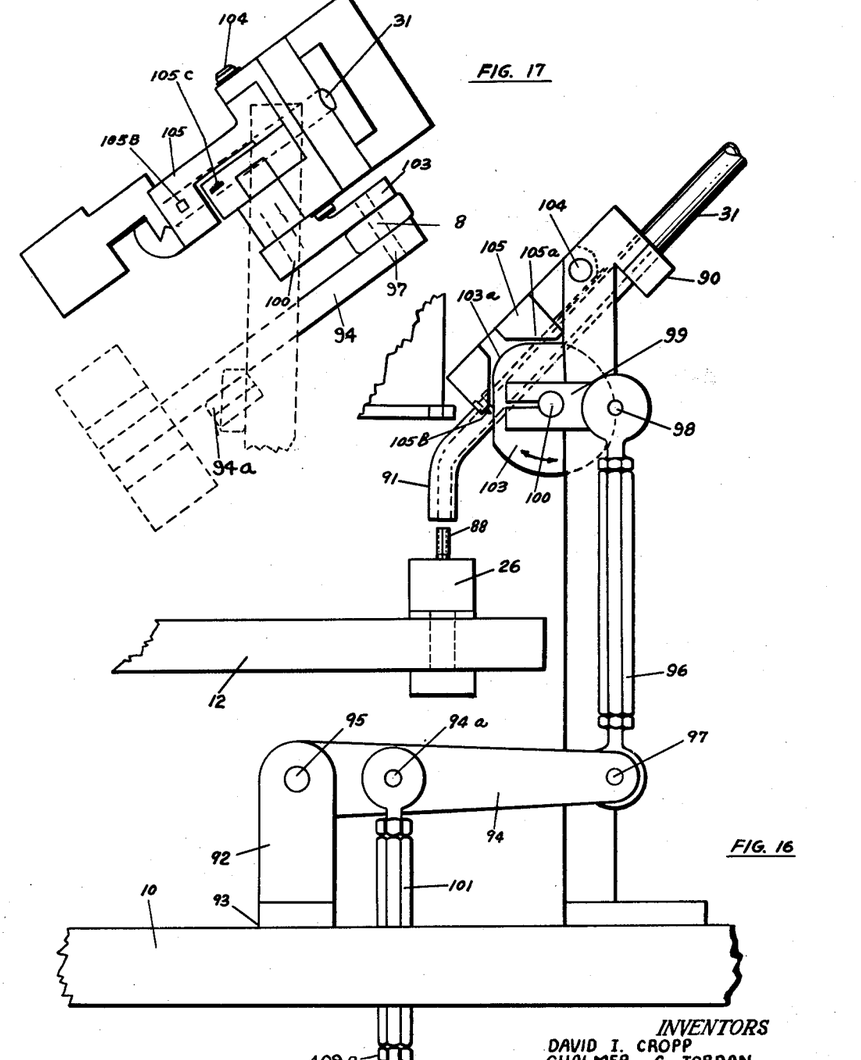
FIGS. 16 and 17 are enlarged views of the glass case loader.

The wire rotating assembly 26 in FIG. 17 is somewhat similar to the assemblies on the turret 11; however, in FIG. 17, a bored mandrel is attached to the top of the member 26.

Stem Loading Drive Assembly

The stem loading drive assembly is shown in FIGS. 25 to 29. The turret 12 has the spaced article rotating assembly 26. Located at each article rotating assembly 26 is the support for the upper end of the cut pieces of dumit wire being asesmbled.

The wire holder 600 is attached to the turret 12 at 601 adjacent each article rotating assembly 26. Each wire holder 600 has a laterally extending arm 602 terminating at its distal end in a notched arm 603 having a notch 604 in the end thereof. An arm 605 is swingably attached to the wire holder 600 at 606 and pivots therearound and is urged toward the notched arm 603 by means of a tension spring 609 which swings the end 601 of the arm into engagement with the end having the notch 604. The notch 604 receives the upper end of a wire 620 of the article assembly 26. The depth of the notch 604 is such that when a wire 620 is disposed therein, there is a clearance of approximately two-thousandths of an inch between the edges of the wire and the edge of the notch 604 so that the wire can freely rotate therein. Thus, the upper end of the wire 620 is restrained against lateral movement and freely rotates in the notch 604 when the lower part thereof having the tube thereon is being rotated while being heated so that the wire will not bend. This makes it possible to provide a support for the upper end of the wire without providing a bearing for receiving the wire.

As the turret 12 rotates and a particular article receiving member 26 approaches the loading station under the case load, a cam 625 which is attached to he support bracket arm 27 having a camming surface 626 thereon engages an end 627 of the lever and swings the lever against the tension of the spring 609 to open position and as the transfer arm 35 swings the wire having a bead assembled thereon from the turret 11 into the wire rotating assembly 26, a permanent magnet 640 is supported on the frame 10 and as each wire holder 600 is moved past it as the turret 12 rotates, the arm 605 passes its slot 630 over the stationary magnet 640 and the magnet 640 magnetically attracts the wire and holds it in position temporarily while the end 627 moves into position. Then as the turret 12 indexes to the next position, the arm end 627 moves past the cam 625 and allows the spring 609 to swing an arm 610 into engagement with the end of the arm 602 having the notch 604 therein, thus providing a restraining member to prevent the wire from moving out of the notch 604 again. The arm 610 remains in this position throughout the remainder of the rotation of the turret 12 to the point of pick-off at an end 632 of the cam 625.

When the particular article receiving member approaches the station adjacent the unloading device 509, the end 627 on the arm 610 will engage the end 632 of the cam 625 and the arm will be swung away from a notched end 623 and allow the unloading jaws 510 and 511 to grasp the wire and lift it out of the wire rotating assembly, swinging it out over a suitable container and dropping the wire.

*Wire Loader*

Figure 14:
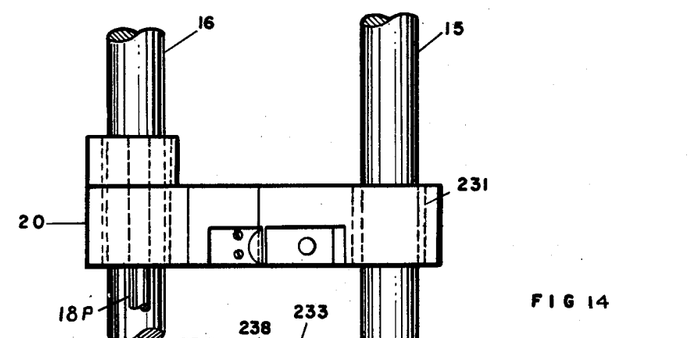
FIGS. 14 and 15 are enlarged views of the wire loader.
Figure 15:
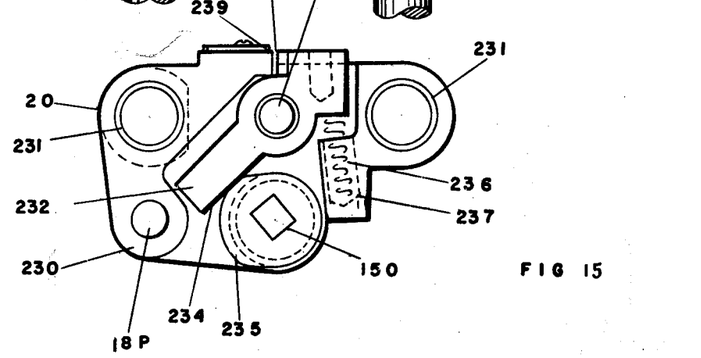

The wire loader 20 is shown in FIGS. 14 and 15 and is slidably supported on the columns 15 and 16. A wire loader body 230 has bores 231 which receive the columns 15 and 16 and the body 230 is freely slidable up and down thereon. A lever 232 is swingably mounted on the body 230 at 233 and is engaged at 234 by a cam 235. A spring 236 is held in a bore 237 in the body 230 and the spring 236 urges the lever 232 to swing into engagement with the cam 235. A jaw 238 clamps the wire between it and a fixed jaw 239. The cam 235 is rotatably mounted on the body 230 and slidably receives the square shaft 150. The body 230 is moved up and down on the columns 15 and 16 by the rod 18P attached to the body 230 and extending down below the turret 11 and actuated by the cam 401.

As the shaft 411 rotates the cam 401 at a constant rate, the body 230 will slide up and down on the columns 15 and 16. The contour of the cam 401 will be such that the wire loader 20 will move down with a cut piece of dumit wire therein to push the piece of wire into the wire rotating member which has stopped thereunder each time a piece of wire is cut off by the cutting edge 119A in FIG. 10.

The cam 235 will rotate to release the piece of wire when the body 230 has reached the lower part of its stroke and the cam 235 will allow the spring 236 to swing the lever 232 into clamping engagement with the end of the dumit wire before the next piece is cut off by the cutting edge 119A when the body 230 has reached the upper end of its stroke.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for cutting wire into pieces of predetermined lengths and fitting beads and said wire together over said wire comprising spaced columns on said machine, means to receive said cut pieces of wire at the bottom of said columns, said columns being adapted to support a spool of wire at the upper end thereof, gripping means to move said wire downwardly a predetermined distance intermittently, means to grip said wire, another means to hold an end of said wire, another means to cut said predetermined lengths of wire off of the end thereof, said holding means moving said wire into said cut wire receiving means after each wire with a bead thereon is discharged therefrom, said means to receive said cut ends of said wire comprising a table having said spaced wire receiving means thereon, means to rotate said wire receiving members, a bead loading mechanism for disposing beads having holes therein over said cut pieces of wire in said wire receiving members around said table for hermetically sealing said beads to said cut pieces of wire, said machine having a second table, means on said second table for rotatably receiving said cut pieces of wire, means to synchronize the rotation of said second table with said first table, means for transferring said cut pieces of wire from said first table to said second table in synchronism with the movement of said tables, means for feeding glass tubes onto said second table to receive said wire and said beads, and heating means for sealing said beads to the inside of said glass tubes.

2. The machine recited in claim 1 wherein said transfer means comprises an arm pivoted about a horizontal axis, means for gripping said pieces of wire on the distal end of said arm, means for moving said arm vertically to move said wire out of said wire receiving means, means to swing said arm one hundred eighty degrees about said horizontal axis after it has lifted said wire whereby said lifted wire is moved over said second table, means for lowering said arm whereby said wire is lowered into a wire holding means on said second table for rotatably receiving said pieces of wire, and means to release said gripping means on the distal end of said arm when said wire is in said second gripping means.

3. The machine recited in claim 1 wherein said second gripping means comprises a permanent magnet fixed to said second table, and means fixed to said second table to move said wire away from said permanent magnet.

4. A machine for inserting wires of predetermined length into beads, fusing said beads onto said wires, subsequently inserting said wires into a glass sleeve, and sealing said sleeve to said beads comprising two spaced tables each having its top surface thereof disposed in a common plane with the other, spaced wire rotating members disposed adjacent the outer periphery of each said table, means rotating said wire rotating members, means to cut a continuous piece of wire into pieces of predetermined length, means to put beads on said wire, means on said machine to heat seal said beads to said wire, means on said machine to transfer said wire to said second table from said first table in synchronism with the movement of said tables, means on said machine to feed glass tubes over said wire and said beads, and means to fuse said beads to said tubes.

5. The machine recited in claim 4 wherein means to rotate said rotating members is provided, said means to rotate said rotating members comprising a sprocket on the lower end of each said rotating member, a continuous chain passing around all of said sprockets, and motor means for driving said chain whereby said rotating members are rotated.

6. A machine for assembling glass members on wires of predetermined length comprising first means for supporting pieces of wire of predetermined length and rotating them, a plurality of successive heat stations, said rotating means moving said pieces of wire progressively past said successive stations, means to feed beads onto said wire, means to heat seal said beads to said wire, means to transfer said beads and wire pieces to a second wire supporting means, means to feed glass tubes onto said pieces of wire, means to move said wire and tubes successively from one said heat station to another in synchronism with the movement of said first wire supporting means, and heat means on each said heat station for sealing said tubes to said beads.

7. The machine recited in claim 6 wherein said heat means is generated by means of a flame supported by combustible gas.

8. The machine recited in claim 7 wherein said rotating means comprises turrets having flat top surfaces, each said turret having its top surface disposed in a common plane with the other said turret, and means for transferring said wire from one said turret to the other.

9. The machine recited in claim 8 wherein said means for moving said pieces of wire comprises rotatable members disposed on said turrets, a sprocket on each said rotatable member, a continuous chain disposed around said sprocket on each said turret, and means to drive said chain whereby said rotatable members are rotated.

10. A bead loader comprising two jaws, said jaws being swingable toward and away from each other, a groove formed in each said jaw in the side thereof adjacent the other said jaw, said grooves together forming a bore when said jaws are swung together, said bore being counterbored, means to deposit a bead in said counterbore with the hole in said bead aligned with said bore when said jaws are swung away from each other, means to move said jaws toward each other bringing said bead into engagement with the walls of said counterbore holding said bead therein, means to move said jaws and bead therein relative to a wire whereby said wire enters said bore and the hole through said bead, means to cut said wire into predetermined lengths, means to rotate said lengths rapidly each with a said bead thereon, means to heat said bead and wire while rotating, means to transfer said bead and wire to a second rotating means, and means to feed a glass tube over a said wire.

References Cited in the file of this patent

UNITED STATES PATENTS

| | | |
|---|---|---|
| 1,673,731 | Brindle | Jan. 12, 1928 |
| 1,733,881 | Illingworth | Oct. 29, 1929 |
| 1,962,902 | Kunath | June 12, 1934 |
| 2,163,071 | Stringer | June 20, 1939 |
| 2,199,852 | Iden | May 7, 1940 |
| 2,379,886 | De Witt et al. | July 10, 1945 |
| 2,425,127 | Schafer | Aug. 5, 1947 |
| 2,434,664 | Malloy | Jan. 20, 1948 |
| 2,626,985 | Gates | Jan. 27, 1953 |
| 2,698,987 | McGowan | Jan. 11, 1955 |
| 2,729,877 | Roeber et al. | Jan. 10, 1956 |
| 2,740,186 | Gates | Apr. 3, 1956 |
| 2,823,815 | Doron et al. | Feb. 18, 1958 |
| 2,829,782 | Roeber | Apr. 8, 1958 |
| 2,832,478 | Malewicz et al. | Apr. 29, 1958 |
| 2,848,784 | Pakish et al. | Aug. 26, 1958 |

FOREIGN PATENTS

| | | |
|---|---|---|
| 580,308 | Canada | July 28, 1959 |